United States Patent

[11] 3,593,153

[72] Inventors Peter Maitland
St. Petersburg;
Richard W. Ehrhorn, Largo, both of, Fla.

[21] Appl. No. 789,501
[22] Filed Jan. 7, 1969
[45] Patented July 13, 1971
[73] Assignee Electronic Communications, Inc.
St. Petersburg, Fla.

[54] NARROW BANDWIDTH RADIO RECEIVER HAVING MEANS TO POSITION AN RF SIGNAL WITHIN A STEEP SIDED PASSBAND FILTER
5 Claims, 1 Drawing Fig.

[52] U.S. Cl. .......... 325/432, 325/442
[51] Int. Cl. .......... H04b 1/26, H03d 7/16
[50] Field of Search .......... 325/430, 431, 432, 433, 442, 421, 489, 467

[56] References Cited
UNITED STATES PATENTS
2,846,573 8/1958 Mahland .......... 250/20

*Primary Examiner*—Robert L. Griffin
*Assistant Examiner*—Kenneth W. Weinstein
*Attorney*—Hopgood and Calimafde

ABSTRACT: A narrow bandwidth radio receiver is described wherein pass band tuning of an RF signal is accomplished by using a variable beat frequency oscillator (BFO) signal to alter an injection frequency in a direction to selectively position an RF signal within a passband filter having a steep side without changing the relationship between the RF signal and the BFO signal.

PATENTED JUL 13 1971 3,593,153
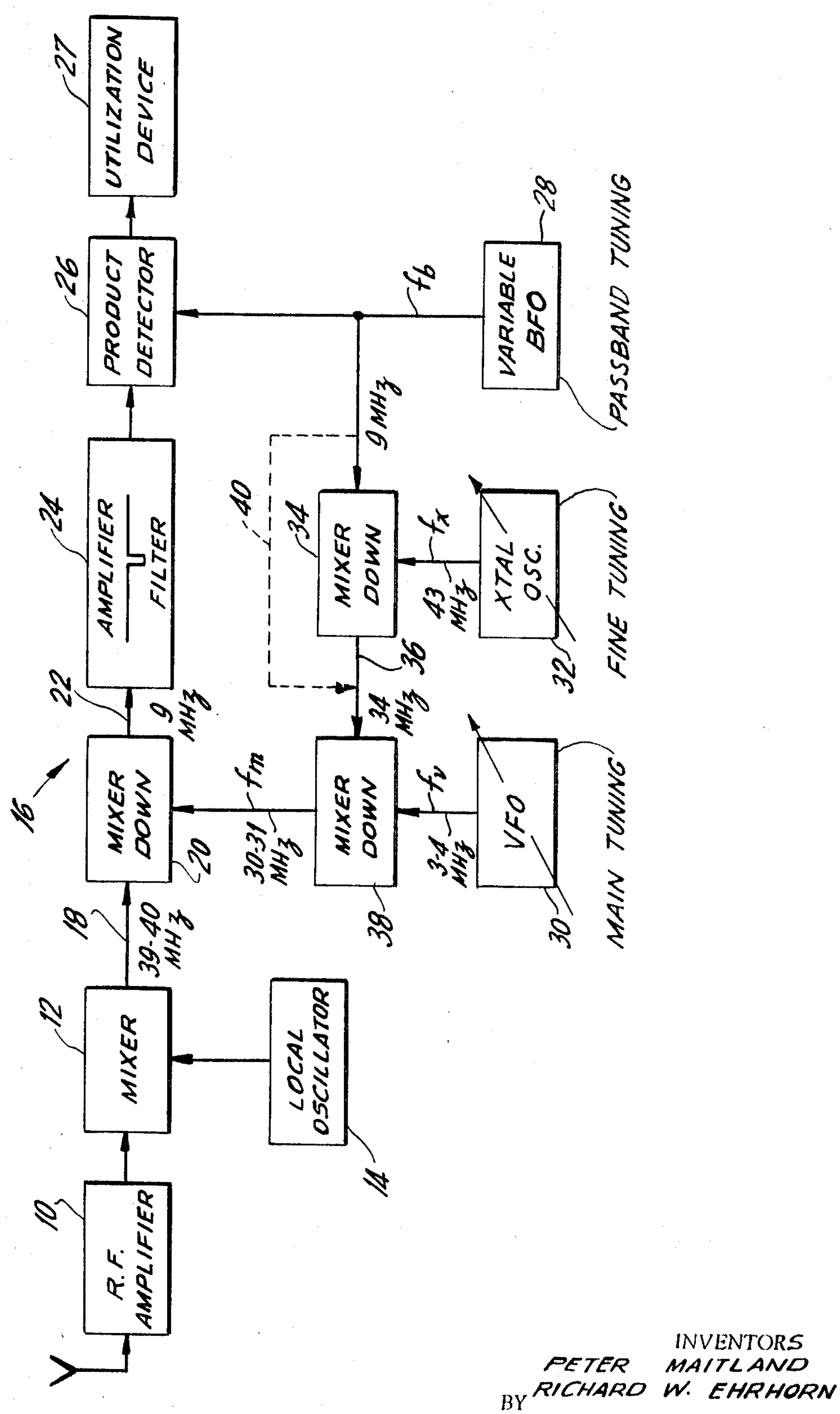
INVENTORS
PETER MAITLAND
BY RICHARD W. EHRHORN
Hopgood & Calimafde
ATTORNEYS

NARROW BANDWIDTH RADIO RECEIVER HAVING MEANS TO POSITION AN RF SIGNAL WITHIN A STEEP SIDED PASSBAND FILTER

This invention relates to a radiofrequency receiver generally, and specifically to a radiofrequency receiver wherein an information-carrying radiofrequency signal is shifted within a narrow IF passband by utilizing electronic tracking means that does not affect the tuning frequency of the receiver.

In the reception of information-bearing radiofrequency signals, narrow bandwidth radio receivers are often employed to enable for instance the selection of one of many closely adjacent (in frequency) signals or to obtain adequate rejection of spurious RF signals. Narrow bandwidth reception commonly involves a beat frequency oscillator, BFO, at the output of a narrow bandwidth terminal intermediate frequency (IF) amplifier which beats with the RF signals for subsequent detection in for instance a product detector. A typical example where such narrow band reception is used is in the transmission of single sideband voice signals on a radio channel. The receiver for such narrow band reception is generally provided with an IF amplifier having a filter of narrow bandwidth, say several kilocycles, with a center frequency of for instance about 10 MHz. The output of such IF amplifier and filter is then applied to a product detector which, in combination with the BFO signal detects the RF signals.

It is often desirable to seek rejection of near-frequency interfering signals by taking advantage of the sharp attenuation skirts of the narrow band filter used in the main RF signal path. Such rejection may be accomplished by adjusting the RF signal in the passband of the filter to place it adjacent the skirt with of course the unwanted signal high up on the skirt for its maximum attenuation. Such RF signal adjustment must be accomplished by a corresponding change in the BFO lest a serious distortion of the signal output from the product detector arise. A preferred method for such RF signal adjustments thus involves a tracking arrangement wherein frequency adjustments of RF signals are accompanied by corresponding changes in the BFO.

In the prior art, such tracking was accomplished by utilizing mechanical linkages between the BFO and a variable frequency oscillator (VFO), the frequency of which determined the position of the RF signals in the filter passband. In another arrangement, the filter passband was altered by constructing it of tunable LC filters which were varied in order to move the passband relative to the RF signal. Both of these approaches involve undesirable features. For instance, the tracking of the BFO and VFO involves a rather small frequency change and consequently quite accurate mechanical linkage arrangements must be employed that are unreliable and expensive to manufacture. The variable passband device utilizing the tunable LC filters suffers from rather poor edge band characteristics, as compared with those obtainable from crystal lattice filters and thus has reduced ability to "screen out" frequency adjacent interfering signals. Since the crystal controlled lattice filter has an excellent passband curve with sharply defined edges it is a preferred device for operating with a narrow band receiver.

It is therefore an object of this invention to provide a narrow bandwidth radio receiver utilizing a crystal controlled lattice filter.

It is a further object of this invention to provide an RF receiver wherein RF signals may be adjusted within the passband of a narrow band crystal lattice filter without altering the selected tuning frequency for the RF receiver.

It is still further an object of this invention to provide a highly stable RF receiver which automatically compensates for deleterious effects caused by temperature variation and the like of a beat frequency oscillator used in the detection of the RF signals without alteration of the main tuning frequency of the receiver.

The above-mentioned and other features and objects of this invention and the manner of attaining them will become more apparent and the invention itself will best be understood by reference to the following description of an embodiment of the invention taken in conjunction with the accompanying drawing, the description of which follows:

The FIGURE is a schematic representation of a radio receiver incorporating this invention.

Briefly stated, our invention contemplates a radio receiver wherein radiofrequency signals are superheterodyned with an injection frequency oscillator to produce an intermediate frequency (IF) signal which, after passage through a very narrow bandwidth filter, is demodulated in a product detector served by a beat frequency oscillator (BFO). An electronic automatic frequency compensating loop is provided to selectively adjust the IF signal within the passband of the filter and includes another local oscillator signal source with combines with the BFO to produce the injection frequency oscillator signal. The loop is so arranged that a change in the frequency of the BFO produces a corresponding frequency shift in the IF signal.

In the FIGURE, antenna-received signals are applies to a radiofrequency amplifier 10 of considerable bandwidth and which may be tunable. The output of the RF amplifier is applied to a first mixer 12 to which is also applied a local oscillator signal from a source 14 to obtain an IF signal at a suitable center frequency and located within a passband, say 39 to 40 MHz. Thus the main function of local oscillator 14 is to make a coarse frequency selection and present the narrow band receiving section generally indicated at 16 with a 1 MHz. wide spectrum of RF signals.

The 1 MHz. wide RF signals from mixer 12 are then applied either directly as shown in the drawing or after amplification to input 18 of mixer 20 for frequency conversion by an injection frequency $f_m$ obtained from the output of a mixer circuit 21. Injection signal $f_m$ is variable from, say, 30 to 31 MHz. to provide at the output of mixer 20 a terminal IF signal of a center frequency of 9 MHz. The mixer 20 output signal on line 24 is applied to a terminal IF amplifier 22 which incorporates a crystal lattice filter. The terminal IF amplifier and filter 24 exhibit a very narrow bandwidth of several kHz. with sharply rising band edges to provide a high degree of sensitivity for the receiver. The output of the terminal IF amplifier and crystal lattice filter 24 is applied to a product detector 26 which detects the RF signals by combining the output of the terminal IF amplifier with a variable beat frequency oscillator (BFO) 28 applied to the detector 26. The output of detector 28 is coupled to a utilization device 27 such as a loud speaker.

The RF signal selected in the 1 MHz. wide spectrum on input 18 is determined by injection frequency $f_m$ composed of a variable frequency oscillator (VFO) 30 and a second crystal controlled fined tuning oscillator 32. However, the injection frequency signal is composed of still a third signal, i.e. the BFO, which acts as a feedback adjustment of the selected RF signal within the passband of the amplifier filter 24.

This feedback arrangement operates as follows. The BFO signal of about 9 MHz. is combined in a mixer circuit 34 with the output of crystal oscillator 32 which is at about 43 MHz. The downbeat (34 MHz.) of the frequencies generated by mixer 34 is selected at output 36 and applied to an input of a mixer circuit 38 to which the output from VFO 30 is also coupled. The VFO frequency is variable from 3 to 4 MHz. and since mixer circuit 38 also supplies the downbeat as its output signal the injection frequency $f_m$ varies from 30 to 31 MHz. It is to be realized that the VFO 30 is the main tuning control and that the crystal oscillator 32 can be varied only over a small frequency range.

Suppose now that closely adjacent the desired RF signal frequency (say 39.000 MHz.) is a strong interfering signal located at the high side (say 39.002 MHz.). This interfering signal may be significantly reduced by the passband tuning of this invention. Assuming that the VFO 30 frequency is at 4 MHz. and the crystal oscillator 32 at its nominal frequency of 43 MHz., then by increasing the BFO by 2 kHz. the injection frequency $f_m$ is correspondingly decreased by 2 kHz. and the desired RF signal is placed at the frequency of 39.002 MHz., yet the interfering signal is now located at 39.004 MHz. Since a crystal lattice filter is employed, the edges of the band effectively cut off the interfering signal. Since the passband adjustment was made in synchronism with the BFO, there is no distortion in the output of the product detector 26.

It thus can be seen that the passband tuning is accomplished without affecting receiver tuning. In addition, automatic cancellation is accomplished for unexpected drifting of the BFO. Variations from the embodiment may be considered. For instance, the mixer 34 and crystal oscillator 32 could be dispensed with and the BFO directly applied via the dashed line 40 to an input of mixer 38. The frequency of the VFO 30 would then have to be altered to provide the desired injection frequency $f_m$.

While the principles of the invention have been described in connection with specific apparatus, it is to be clearly understood that this description is made only by way of example and not as a limitation to the scope of the invention as set forth in the objects thereof and in the accompanying claims.

We claim:

1. A highly stable narrow bandwidth receiver comprising 1 means responsive to receiver radiofrequency signals for producing an amplified first intermediate frequency signal representative thereof, a first mixer circuit having first and second inputs with the first input coupled to the intermediate frequency signal, a narrow bandwidth amplifier having a sharply defined passband and having its input coupled to the output of the first mixer circuit, a variable beat frequency oscillator source for passband tuning, a detector coupled to the output of the narrow bandwidth amplifier and the beat frequency oscillator source for producing a utilization signal, a main tuning, variable frequency local oscillator course, a second mixer having first and second inputs and a beat frequency output, the first input being coupled to the main tuning, variable frequency local oscillator source and the second input being coupled to the passing tuning, beat frequency oscillator source, and the beat frequency output coupled to the second input of the first mixer, whereby changes in the output of the variable beat frequency oscillator alter the position of the radiofrequency signal within the passband without altering the tuning frequency of the receiver.

2. The device as recited in claim 1 wherein the narrow bandwidth amplifier includes a crystal lattice filter.

3. In a highly stable radiofrequency receiver wherein information-carrying radiofrequency signals are converted with the use of an injection frequency oscillator to an intermediate frequency signal which, after passage through a very narrow sharply defined, bandwidth filter, is demodulated in a product detector with a variable beat frequency oscillator coupled thereto and including a first mixer to apply the intermediate frequency signal to said detector, the improvement comprising an electronic automatic frequency compensating feedback loop including a first variable frequency oscillator source, means including a second mixer circuit having a first input coupled to the variable frequency oscillator signal source and a second input coupled to the variable beat frequency oscillator, the output thereof providing the desired input frequency signal to said first mixer, with the conversion of the radiofrequency information signals and the mixer circuit being selected to provide a frequency change in the intermediate frequency signal corresponding to variations in the beat frequency oscillator, the beat frequency oscillator being variable for selectively positioning the intermediate frequency signal within the passband of the filter without alteration of the tuning frequency of the radio receiver.

4. The device as recited in claim 3 wherein the feedback loop further includes a second fine tuning local oscillator source, a third mixer circuit having a first input coupled to the second local oscillator source and having a second input coupled to the beat frequency oscillator and having a converter output coupled to the second input of the second mixer circuit said first variable and second fine tuning oscillators being variable in frequency to provide respectively coarse and fine tuning of the radiofrequency receiver.

5. A method for operating a highly stable radiofrequency receiver wherein information carrying radiofrequency signals are converted with the use of an injection frequency oscillator to an intermediate frequency signal which, after passage through a filter of preselected bandwidth, is demodulated in a product detector with a variable beat frequency oscillator coupled thereto, comprising the steps of combining the beat frequency oscillator signal with a main tuning local oscillator signal to produce the injection frequency, varying the frequency in the beat frequency oscillator signal to produce a corresponding change in the frequency of the intermediate frequency signal without requiring an alteration of the receiver tuning frequency.